Jan. 27, 1948.     A. F. SEIDER     2,435,021
FRONT AND REAR WHEEL DRIVEN MOTOR VEHICLE
Filed March 11, 1944     6 Sheets-Sheet 1
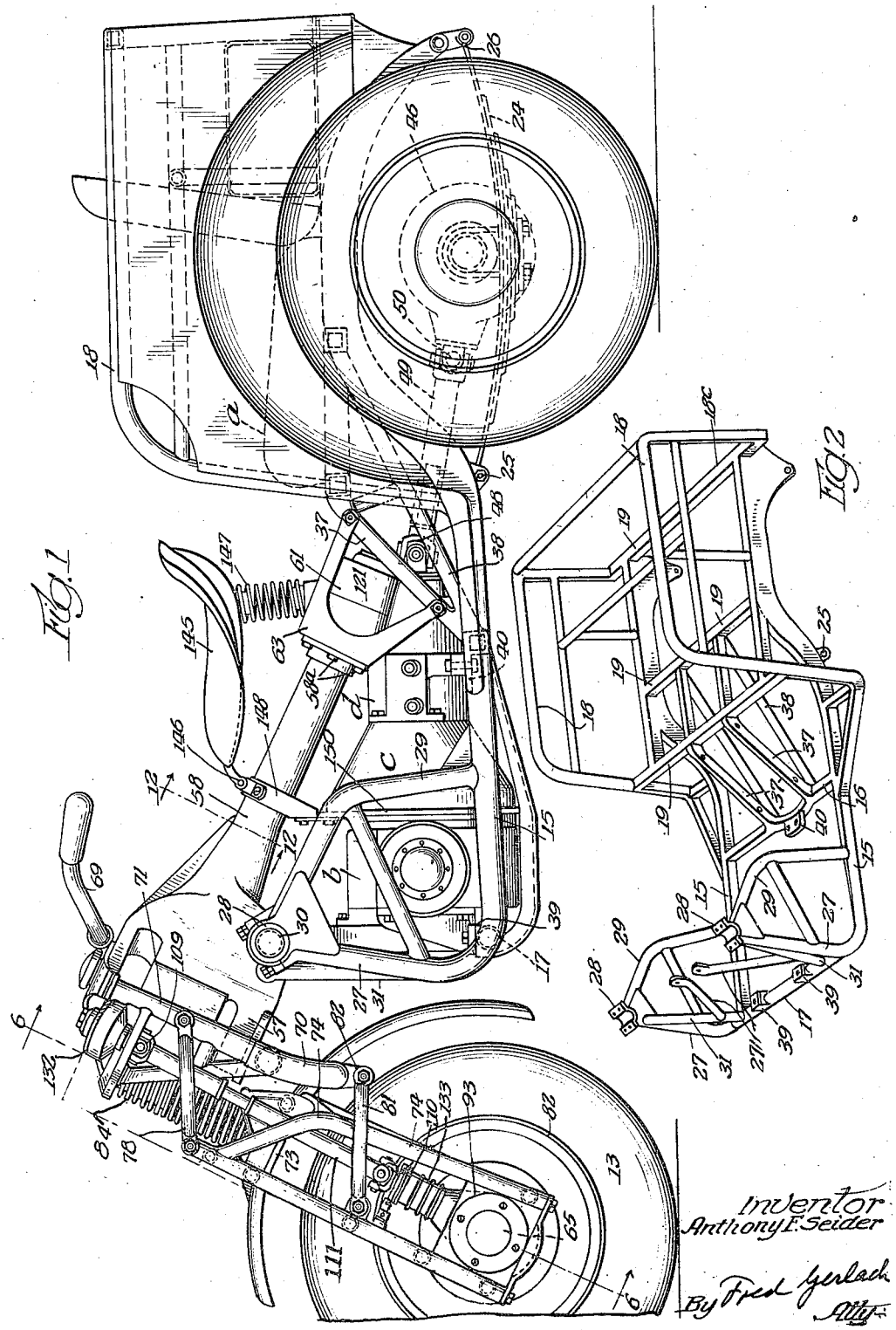

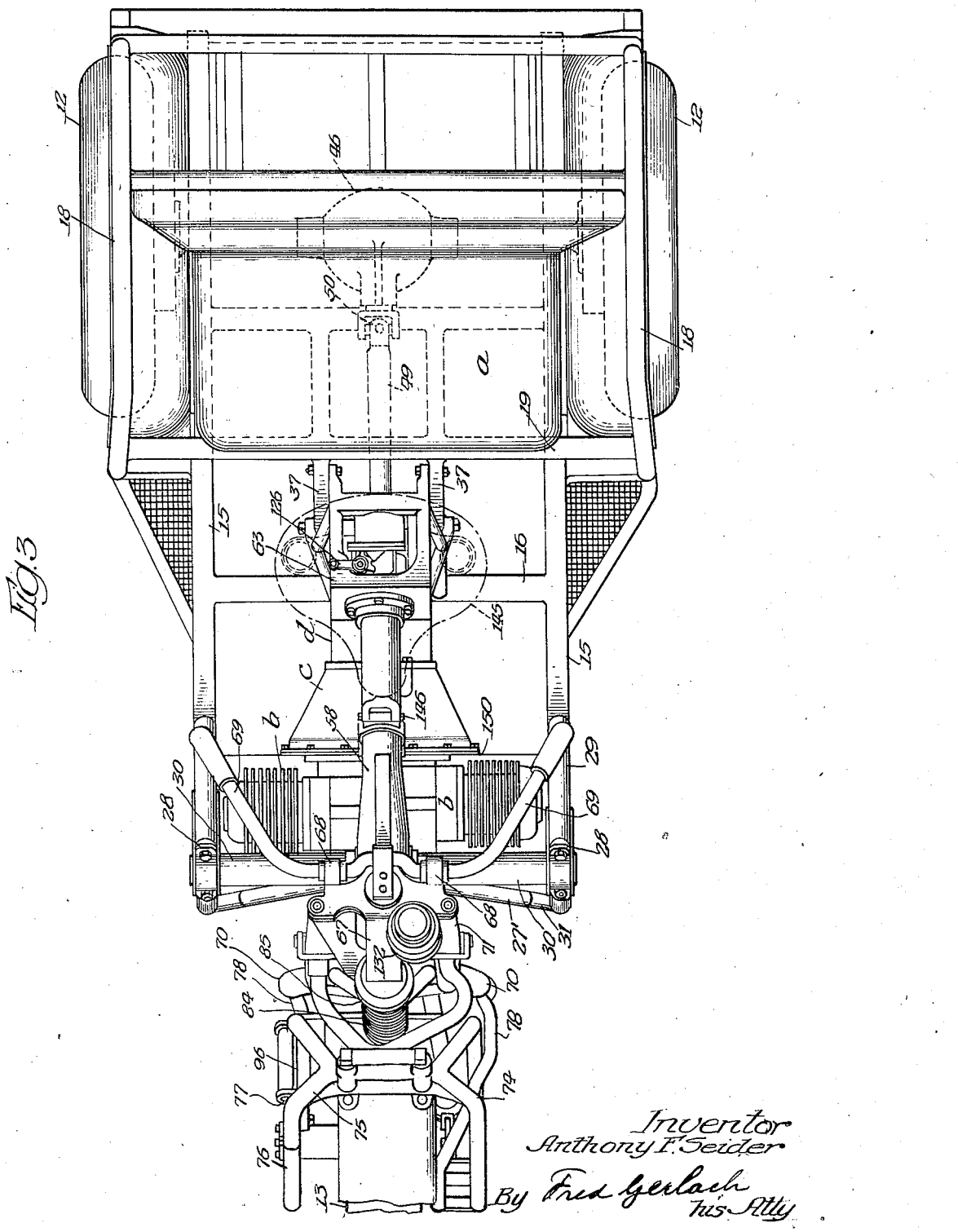

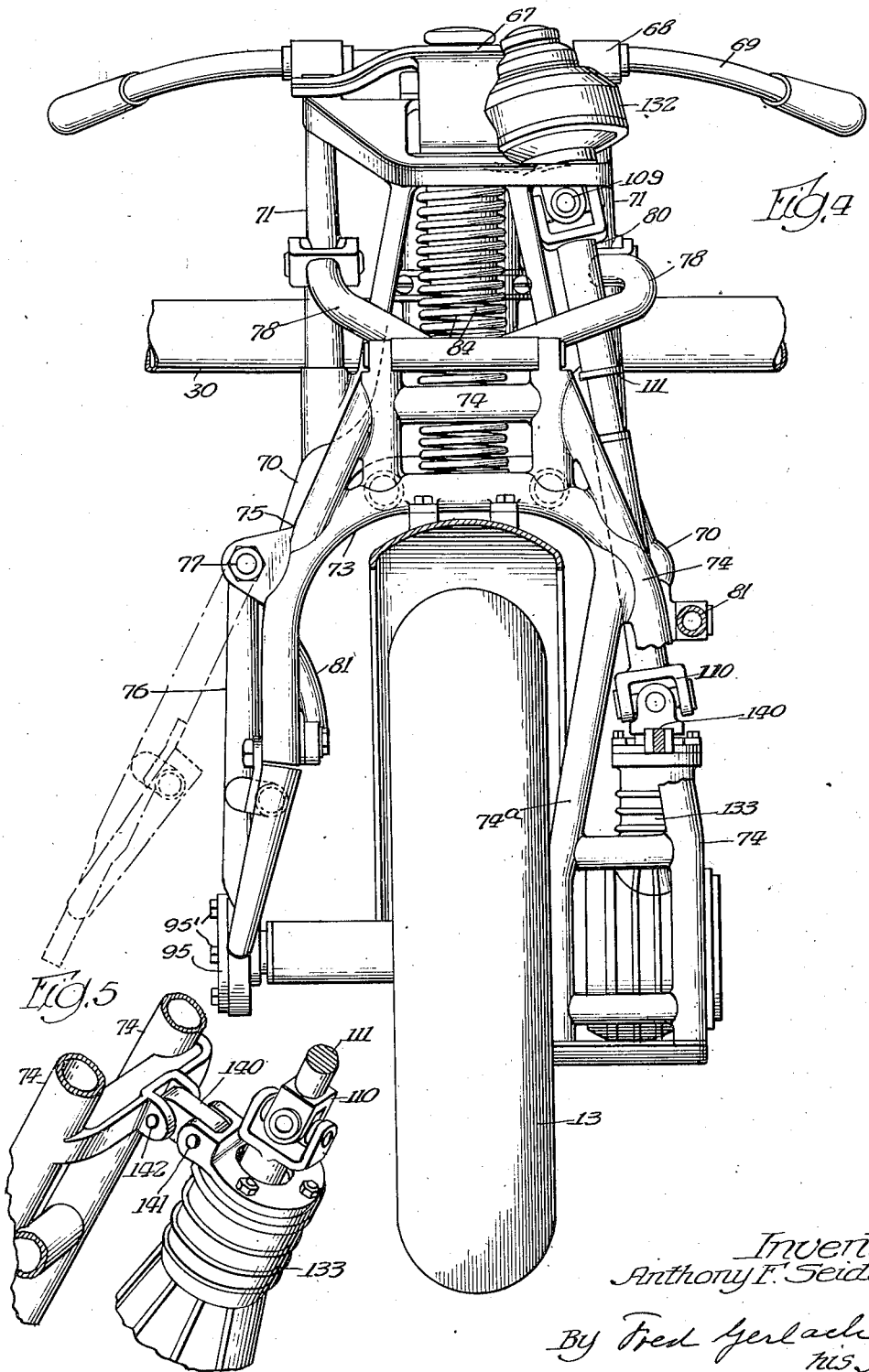

Jan. 27, 1948. A. F. SEIDER 2,435,021
FRONT AND REAR WHEEL DRIVEN MOTOR VEHICLE
Filed March 11, 1944 6 Sheets-Sheet 4
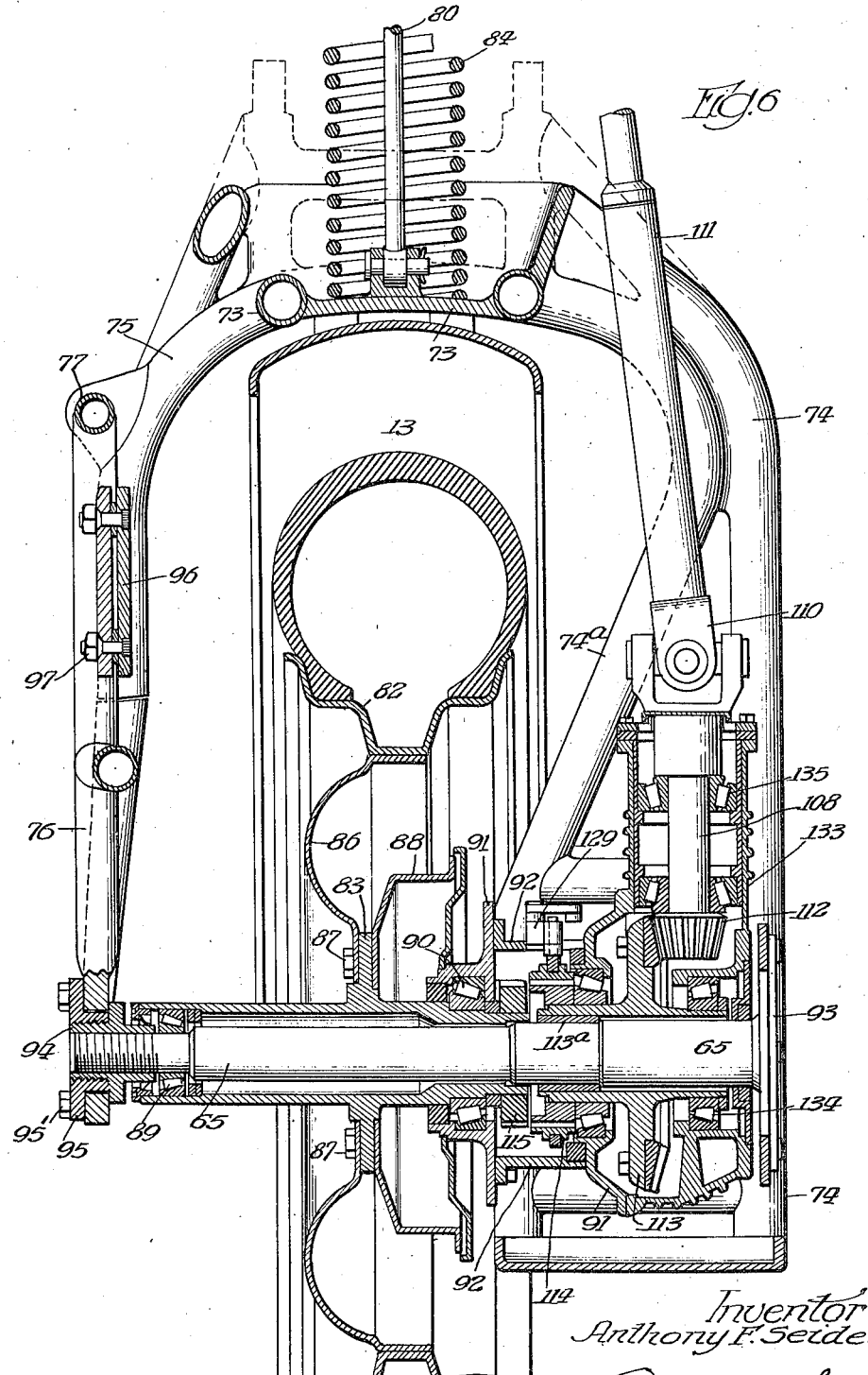

Jan. 27, 1948.　　　A. F. SEIDER　　　2,435,021
FRONT AND REAR WHEEL DRIVEN MOTOR VEHICLE
Filed March 11, 1944　　　6 Sheets-Sheet 5

Inventor
Anthony F. Seider
By Fred Gerlach
His Atty.

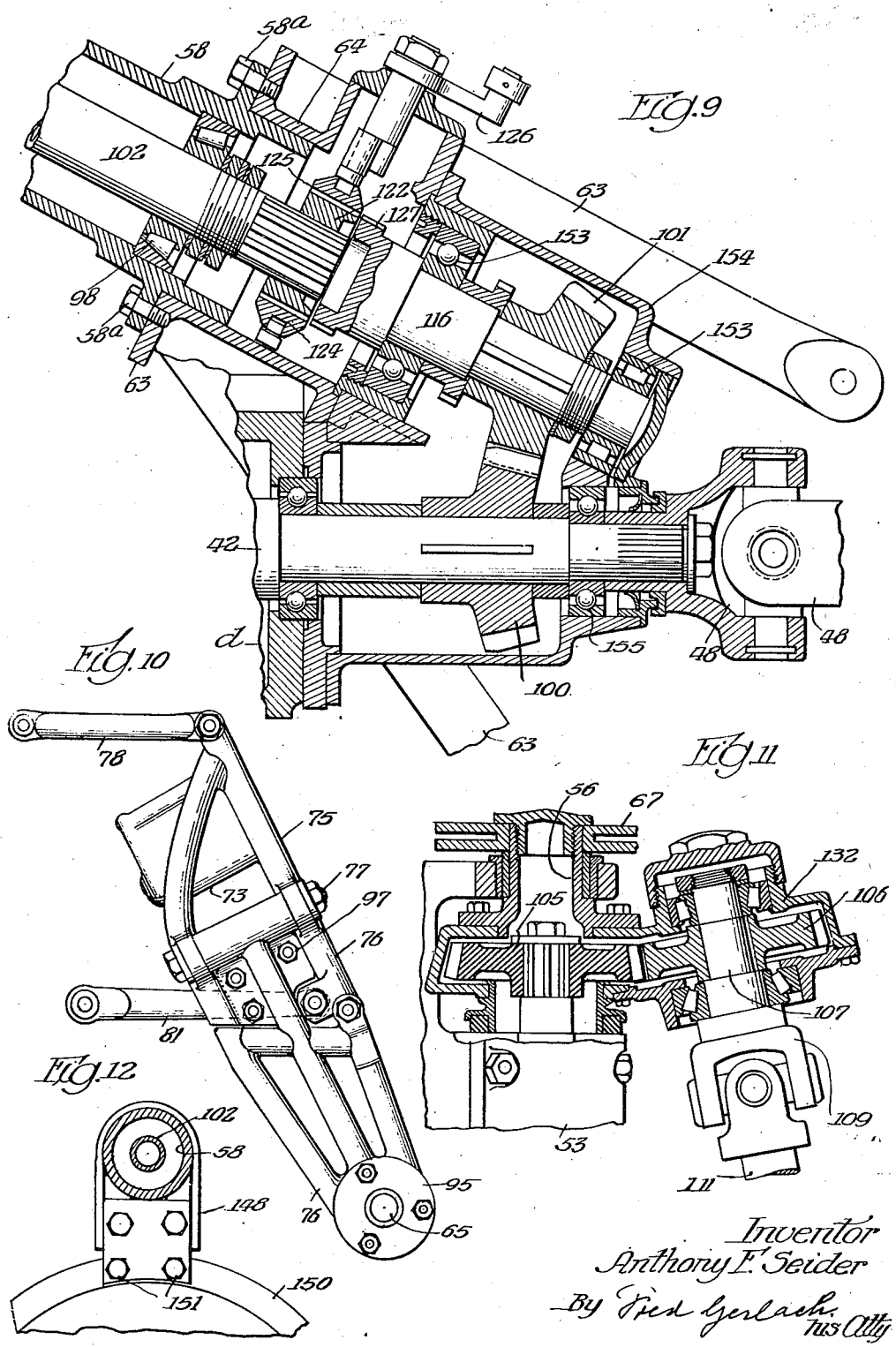

Patented Jan. 27, 1948

2,435,021

UNITED STATES PATENT OFFICE 2,435,021

FRONT AND REAR WHEEL DRIVEN MOTOR VEHICLE

Anthony F. Seider, Chicago, Ill.

Application March 11, 1944, Serial No. 526,083

11 Claims. (Cl. 180—25)

The invention relates to motor driven vehicles, and more particularly to that type which includes a motor driven single steering wheel.

One object of the invention is to provide a motor driven vehicle which comprises a single steering wheel and mechanism for driving the steering wheel which includes a shaft coaxial with its turning axis and by which the turning torque on the steering wheel is balanced so that the driving torque will not interfere with steering movements of said wheel.

Another object of the invention is to provide improved driving mechanism for the front steering wheel which includes a drive shaft which is coaxial with the steering fork and a vertically extending shaft at one side of the wheel which is bodily pivotally movable around said axis, and gearing by which the driving torque will be balanced and leave the wheel free to turn for steering.

Another object of the invention is to provide a motor driven vehicle which comprises a pair of rear traction wheels and a single driven front steering wheel and demountable frame sections which facilitate access to the motor and gearing for repair or replacement.

Another object of the invention is to provide driving mechanism for the front steering wheel which includes a clutch for idling said wheel, and a clutch for idling the driving mechanism for said wheel when desired.

Another object of the invention is to provide an improved driven steering assembly which includes a fork which is provided with a hinged or removable side for the removal of the wheel from the fork without removing the driving mechanism carried by the fork.

Other objects of the invention will appear from the detailed description.

The invention consists in the several novel features hereinafter set forth and more particularly defined by claims at the conclusion hereof.

In the drawings:

Fig. 1 is a side elevation of a motor driven vehicle embodying the invention.

Fig. 2 is a perspective of the rear frame section.

Fig. 3 is a plan.

Fig. 4 is a front elevation.

Fig. 5 is a perspective of the connection between the steering fork and the housing for the gearing on the front axle.

Fig. 6 is a section taken on line 6—6 of Fig. 1.

Fig. 9 is a longitudinal section illustrating the gearing between the engine driven shaft and the shaft driven thereby for driving the steering wheel.

Fig. 10 is a side elevation of the steering fork which is provided with a pivoted section for the removal of the steering wheel from its axle.

Fig. 11 is a section taken on line 11—11 of Fig. 8.

Fig. 12 is a section taken on line 12—12 of Fig. 1.

Figure 7:
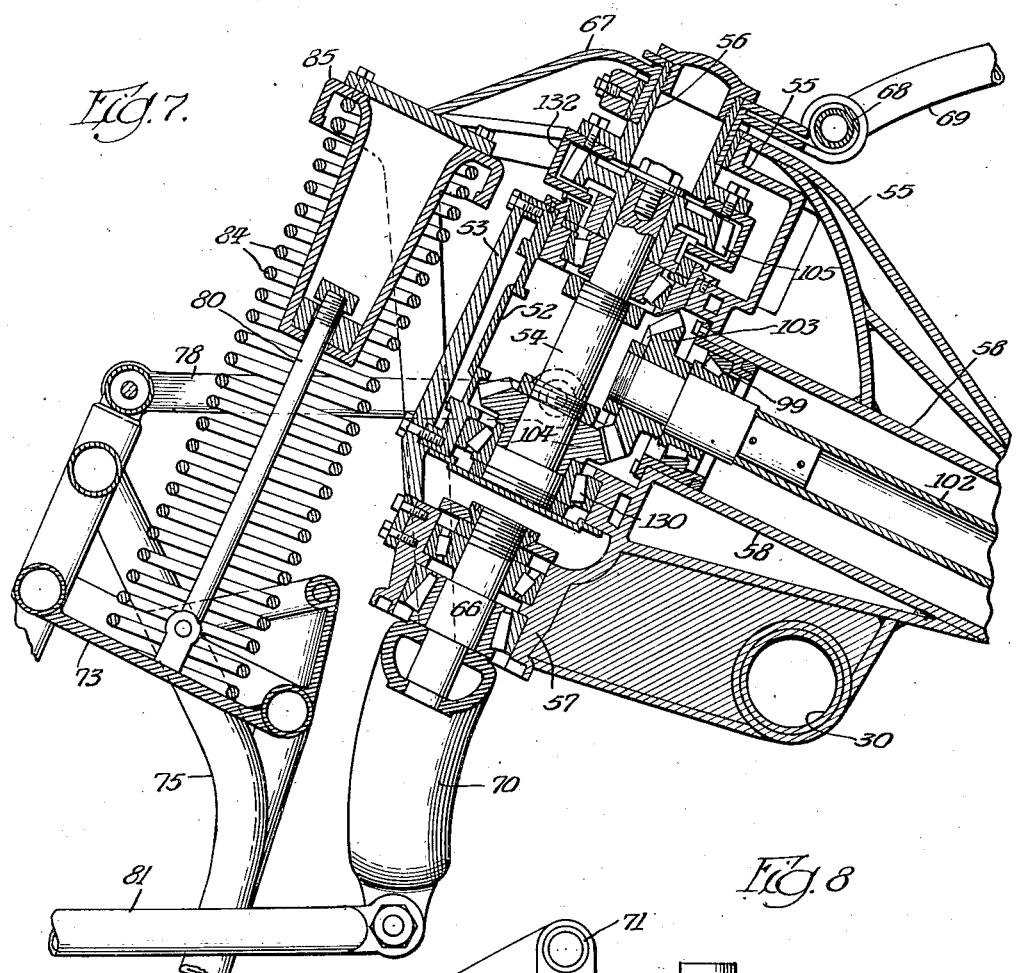
Fig. 7 is a longitudinal section through the steering fork.

The invention is exemplified in a motor driven vehicle of the three-wheel type which includes a pair of rear coaxial traction wheels 12 and a single front steering wheel 13 which is disposed at the transverse center of the vehicle.

The supporting frame is formed of demountably connected front and rear sections. The front frame-section includes a socket for the steering fork spindle and houses some of the gearing for driving the steering wheel. The rear section carries the vehicle body, power unit, and mechanism for driving the rear wheels.

The rear frame-section comprises (Fig. 2) a pair of longitudinally extending base members 15 which are rigidly cross-connected by a front member 17 and an intermediate member 16. The base members 15 are extended rearwardly over the rear axle housing for connection to leaf spring 24, and are also cross-connected by bars 19. The front ends of leaf-springs 24 are pivoted at 25 to the base members 15 and their rear ends are connected to said members by shackles 26. The rear frame-section comprises members 18 which form body-sides. The lower front ends of members 18 converge into the base members 15. At the rear, side-members 18 are rigidly connected by suitable cross-bars to form a rigid body structure. The front ends of base members 15 are extended to form upstanding legs 27. Sectional clamping brackets 28 are secured to the upper ends of the legs 27 and adapted to demountably connect the front end of the rear frame-section to a tubular cross-bar 30 which is supported from the front frame-section, as hereinafter described. Struts 29 and braces 31 also secure the bracket 28 to the base members 15.

A seat $a$ is carried in the body between the side member 18 and on the two foremost crossbars 19. Angular brace members 37 extend diagonally between cross members 16 and the foremost cross-bar 19, and brace member 38 extends between cross member 16 and one of the rear cross members 19. The vehicle is driven from an internal combustion motor *b* of the opposed cylinder type, a clutch within the casing *c*, as well understood in the art, and a transmission gear *d*, all of which are connected together to form a unit adapted to be demountably secured on the frame. A pair of pads 39 on the front cross member 17 and a pad 40 centrally mounted on cross member 16 provide means on which the power unit, including the motor and transmission, are demountably secured by bolts. The output shaft 42 of the transmission *d* extends rearwardly and drives the usual differential gearing 46 through a universal joint 48, a shaft section 49, and a universal joint 50.

The demountable front frame-section carries the socket for the spindle of the fork for the front steering wheel and provides a housing for the gearing which drives a shaft which is coaxial with the steering axis, from the shaft 42. This frame-section comprises a sleeve 52 (Fig. 7) which is provided with a removable front plate 53; a tubular member 58 which is rigid with and extends rearwardly and downwardly from the sleeve 52; an upper housing member 55 in which is journaled the hollow upper section 56 of the spindle for the front wheel fork; and a lower housing member 57 in which is journaled the lower spindle section 66 for the steering wheel fork. The spindle sections 55 and 66 are coaxial. A shaft 54 of the mechanism for driving the steering wheel is journaled in the sleeve 52 of the front frame-section coaxially with the spindle sections 56 and 66. A shaft 102 which constitutes a part of the gearing for driving the front wheel extends longitudinally through the tubular member 58. The lower and rear end of tubular member 58 is demountably secured by bolts 58ª to a bracket 63 which includes arms which are detachably secured by bolts to the struts 37 of the rear frame-section and to a cylindrical housing 64. The bracket 63 provides a demountable connection between the rear end of the front frame-section and the rear frame-section. The tubular member 58 may be disconnected from bracket 63 or the bracket 63 may be disconnected from the struts 37 and removed with member 58. A transversely extending tube 30 is welded to the housing member 57 and the brackets 28 on the upper ends of the upstanding legs 27 on the rear frame-section are demountably secured to the tube 30 to provide a demountable connection between the housing-portion of the front frame-section and the upper front end of the rear frame-section. This demountable connection may also include braces 27' which are rigid with the rear frame-section and are adapted to be bolted to the cross tube 30 adjacent the housing member 57. By detaching the tube 30 which is rigid with the front frame-section at clamp-brackets 28 and braces 27' and detaching the bracket 63 from the struts 37, the entire front frame-section and all of the parts carried thereby can be separated from the rear frame section. When the frame-sections are disconnected, the motor and transmission will be readily accessible for repair or removal from the base of the rear frame-section.

The fork for the steering wheel comprises upper and lower sections with cushioning means between them. The upper fork-section has fixed thereto a plate 67 which is fixed to the upper spindle section 56 and provided with lugs 68 in which the handle bar 69 is secured, and comprises an arch 70 and posts 71 at the sides of the sleeve 52.

The lower fork section comprises an arch member 73, a side 74 which is rigid with the arch 73, and a side which comprises a section 75 which is rigid with the arch 73 and a section 76 which is pivotally connected at 77 to the section 75 to permit the section 76 to be swung outwardly and upwardly for the removal of the wheel 13 from the lower section of the fork. A spring saddle 85 is welded to braces extending from the fork-section 70. Another spring saddle is part of the arch 73 of the lower fork-section. A cushion spring 84 is interposed between these saddles. The upper and lower fork-sections are connected by a pair of upper links 78 and a pair of lower links 81. A stem 80 limits the separation of the members by the springs 84. When the handle-bar 69 is turned, the upper and lower sections of the fork swing together around the axis of the coaxial spindle sections 56, 66.

The steering wheel 13 is rotatable around an axle 65 (Fig. 6) which is mounted in the lower ends of the sides of the lower fork-section and comprises a rim 82; a hub 83, and a body 86 fixed to the rim and demountably secured at 87 to a flange on the hub; and a brake drum 88. One end of the wheel hub 83 is journaled on a roller bearing 89 which is carried by the axle 65 and its other end is journaled in a roller bearing 90 which is mounted in a plate 91 on a housing 92 which is fixed to the inwardly extending branches 74ª of the fork-side 74. One end of the axle 65 is rigidly secured to a plate 93 which is fixedly secured to the lower ends of the outer members of the fork-side 74. A collar 94 is a screw-threaded to the opposite end of axle 65 and a sleeve 95 which extends through an opening in the lower end of side-section 76 of the fork, is provided with a flange for removably retaining the collar 94 in the lower end of side-section 76. The upper end of fork side-section 76 which is pivoted at 77 to the side-section 75 of the fork, is adapted to be secured in its operative position to the fork side-section 75 by bolts 97 which are carried by a plate 96 which is joined to the fork side-section 75. When it is desired to remove the rim and body of the wheel 13 from the hub 83, bolts 95' which secure sleeve 95 against rotation in the side-section 76, are removed. The sleeve 95 can then be unscrewed from the collar 94 so that the fork side-section 76 will be free to be swung outwardly and upwardly on pivot 77 to permit the body, rim and tire of the wheel 13 to be removed through the space between the hub 83 and the lower end of the fork-side section 75.

The power for driving the dirigible front wheel 13 is derived from the output shaft 42 of the transmission *d* and comprises a bevel gear 100 fixed to said shaft (Fig. 9); a bevel gear 101 meshing with gear 100 and fixed to a shaft 116; the shaft 102 which is inclined upwardly and forwardly, and extends through the tubular frame-member 58 and is journaled in bearings 98, 99 in said member; a clutch for selectively driving shaft 102 from shaft 116 which includes a clutch collar 124 which is adapted to couple splines 125 on a collar which is fixedly splined to the shaft 102 and splines 127 on the front end of shaft 116; a bevel gear 103 (Fig. 7) secured to the upper or front end of shaft 102; a bevel gear 104 meshing with bevel gear 103 and fixed to the lower end of shaft 54 which is coaxial with the steering spindle sections 56, 66, and is journaled in sleeve 52; a gear 105 fixed to the upper end of shaft 54;

a gear 106 at one side of and meshing with gear 105; a shaft section 107 fixed to gear 106 (Figs. 8 and 11); a shaft section 108 (Fig. 6); a driving connection between shaft sections 107 and 108 which includes an upper universal joint 109, a lower universal joint 110, and slidably connected shaft sections 111 between said universal joints; a bevel pinion 112 (Fig. 6) fixed to the lower end of shaft-section 108; a bevel gear 113 meshing with gear 112 and journaled at 113ª on the axle 65; a clutch collar 114 which is slidably splined to a collar fixed on the hub of gear 113 and is engageable with a clutch member 115 which is fixed to one end of hub 85 of the steering wheel 13 at the outer side of bearing 90.

A lever 129 for shifting the clutch collar 114 into and out of driving relation with the clutch member 115, is mounted on the housing 92. Shaft section 108, pinion 112 and bevel gear 113 are enclosed in a housing 133 which is rotatably supported around the axle 65 by roller bearings 134 between said housing and the hub of bevel gear 114. Shaft section 108 is journaled in bearings 135 in a vertical extension of the housing 133.

A link 140 (Fig. 5) is pivoted at 141 to the upper end of housing 133 and at 142 to the front member of the forkside 74, and holds said housing against rotation around the axis of the axle 65. The link 140 also causes the housing 133 to turn with the steering fork. The driving torque between the pinion 112 and gear 113 is applied to housing 133 to turn the fork in the opposite direction to the turning torque applied to the upper portion of the steering fork by the gears 105 and 106. A housing 132 is fixed to the upper spindle section 56 and encloses the gears 105, 106, and turns with the fork.

Figure 8:
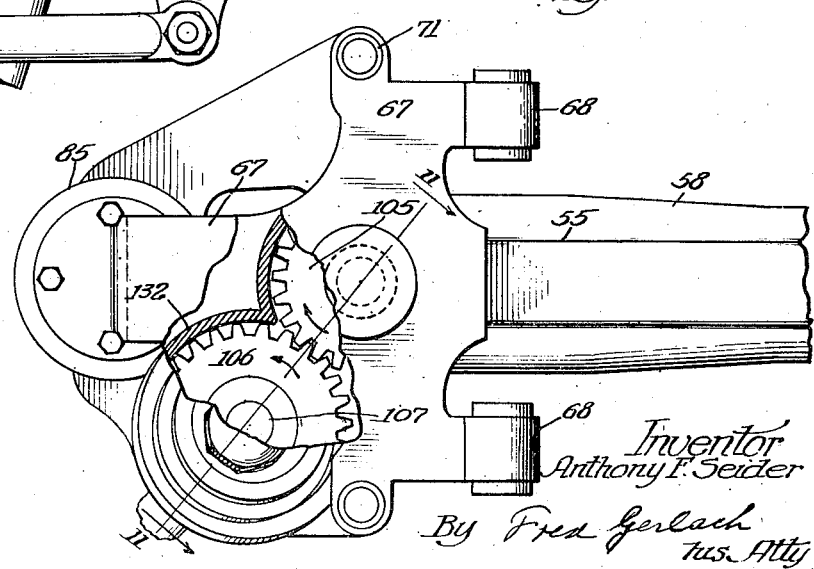
Fig. 8 is a plan of the steering fork and associated gear housing, parts being broken away to illustrate some of the gears therein.

When the steering wheel 13 is driven, the driving torque from gear 105, which rotates in the direction indicated by the arrow in Fig. 8, reacts on gear 106 which is mounted to turn with the steering fork to exert turning torque or moment to the right on the steering fork and wheel 13. The driving torque of pinion 112 (Fig. 6) reacts on the bevel gear 113 and applies turning torque to the left on the steering fork and wheel 13 through link 140. The turning torque produced by the gears 105 and 106 in one direction and the turning torque produced by the pinion 112 and gear 113, are substantially equal so that the turning torques from the driving mechanism will be neutralized so as to leave the steering fork and wheel 13 free for steering movements without interference by the driving torque. In steering vehicles of this type, it is important to provide against deflection by the driving torque of the steering wheel from the position in which it is turned through the handlebars 69. In this construction, the front wheel is driven from shaft 54 which is coaxial with the steering axis.

A saddle 145 is supported at its front by a pivot at 146 on the tubular member 58 and its rear end by a spring 147 which engages the bracket 63 so that the saddle is removable with said bracket and tube. A hanger 148 is welded to the tubular member 58 of the front frame-section and is provided with a depending plate 149 which is adapted to lap the usual flange 150 on the casing of the motor b and to be removably secured by bolts 151 to said flange. When it is desired to separate the front frame-section and parts carried thereby from the rear section and the motor, the bolts 151 are removed and the front frame-section is detached from the rear frame-section as before described. In some instances it is desirable to lift the motor and transmission unit out of the rear frame-section, conjointly with the front frame-section. This can be done by leaving the flange 150 attached to plate 149 and detaching the cross-tube 30 and the bracket 63 from the rear frame-section after the shaft-section 42 has been uncoupled from the universal joint 48, and the motor b has been detached at pads 33 and 40 from the rear frame-section.

Shaft 116 is journaled in bearings 153 which are mounted in a housing 154 which is demountably attached to the rear end of the transmission casing and to the rear end of housing portion 64 which is integrally formed with the bracket 63 and encloses the rear end of shaft 102 and clutch collar 124 and supports the control lever 126. Housing 154 is demountably connected to the rear end of the transmission case, carries a rear end bearing for shaft 42, and encloses gears 100, 101. If desired, the bracket 63 with its integral housing 64 may be detached from the housing 154 to permit the removal of the front frame-section and gearing carried thereby, while gears 100 and 101 are retained in said housing. When it is desired to remove the motor unit with the front frame-section, the joint 48 is uncoupled. The housing 154 and gearing therein can then be removed conjointly with the front-frame section and the motor unit.

In operation, the rear wheels 12 are driven from output shaft 42 through universal joint 48, shaft 49, universal joint 50 and the differential gearing, as well understood in the art. The steering wheel is driven from shaft 42 through gears 100, 101; shaft 116; clutch-collar 124; shaft 102; bevel gears 103, 104; shaft 54; gears 105, 106; shaft 107; universal joints 108, 109, and shaft-sections 110, 111; bevel pinion 112; bevel gear 113; clutch collar 114, clutch member 115, and the hub 85 of the wheel 13.

While the steering wheel is being driven, the driving torque from gear 105 which is coaxial with the steering axis for the front wheel, tends, through gear 106 and shaft 107, to swing the fork to the right, and the driving torque from the pinion 112 tends, through gear 113, housing 133 and link 140, to swing the fork to the left and in this manner the driving torque is neutralized or balanced so that it does not interfere with the turning of the steering wheel and fork by the handle-bar 69.

When it is desired to idle the steering wheel, clutch 114, 115 is uncoupled by lever 129 to permit the wheel 13 to rotate idly around the axle 65, and clutch lever 126 is shifted to uncouple clutch collar 124 from the splines 127 on the shaft 116. This makes it possible to drive the rear wheels and idle substantially all of the gearing for driving the steering wheel.

The invention exemplifies mechanism for driving the single front steering wheel from the shaft which is coaxial with the steering axis through gearing in which the driving torque is neutralized or balanced so it will not interfere with turning of the steering wheel in either direction. The invention also exemplifies a motor vehicle in which the frame is composed of demountable sections, one for the front steering wheel and its driving mechanism and a rear section which carries the body and the power plant to provide convenient access to or removal of the power plant for repair or adjustment. The invention also exemplifies a three-wheeled motorcycle which includes clutches for permitting the steering wheel to run idly and for idling the gearing for driving it.

The invention is not to be understood as restricted to the details set forth, since these may be modified within the scope of the appended claims without departing from the spirit and scope of the invention.

Having thus described the invention, what I claim as new and desire to secure by Letters Patent is:

1. In a motor driven vehicle, the combination with a pair of rear wheels, a steering wheel, a fork for the steering wheel, a motor, and mechanism for driving the rear wheels and the steering wheel from the motor, of a rear frame-section comprising base members and upwardly extending members at the front of the base members, means on the base members for demountably securing the motor thereon, a front frame section comprising a rearwardly and downwardly inclined tubular member, a housing on the front of the tubular member carried by the fork, means for demountably connecting the rear and lower end of the tubular member to the rear frame-section, and means for demountably connecting the upper ends of the upwardly extending members on the rear frame to said front frame-section, the mechanism for driving the front wheel comprising a shaft extending through said tubular member.

2. In a motor driven vehicle, the combination with a pair of rear wheels, a steering wheel, a fork for the steering wheel, a motor, and mechanism for driving the rear wheels and the steering wheel from the motor, of a rear frame-section comprising base members and upwardly extending members at the front of the base members, means on the base members for demountably securing the motor thereon, a front frame section comprising a rearwardly and downwardly inclined tubular member, a housing on the front of the tubular member carried by the fork, means for demountably connecting the rear and lower end of the tubular member to the rear frame-section, a cross member on the upper portion of the front frame section, and means for demountably connecting the upper ends of the upwardly extending members on the rear frame to said cross member.

3. In a motor driven vehicle, the combination with a pair of rear wheels, a front steering wheel, a supporting frame, a motor mounted on the frame, mechanism for driving the rear wheels from the motor, and mechanism for driving the front wheel from the mechanism for driving the rear wheels, of a clutch adjacent the driving mechanism for the rear wheels for disconnecting the mechanism for driving the front wheel from the mechanism for driving the rear wheels, and a clutch at one side of and coaxial with the front wheel for disconnecting the driving mechanism for the front wheel so that the mechanism for driving the front wheel will idle while the vehicle is traveling.

4. In a motor driven vehicle, the combination with a pair of rear wheels, a front steering wheel, a supporting frame, a motor mounted on the frame, mechanism for driving the rear wheels from the motor, and mechanism for driving the front wheel from the mechanism for driving the rear wheels, comprising an upwardly and forwardly inclined shaft and gearing between said shaft and the front wheel, of a clutch adjacent the rear end of said shaft for disconnecting said shaft from the mechanism for driving the rear wheels, and a clutch at one side of and coaxial with the front wheel for disconnecting said gearing from the front wheel so that said shaft and gearing will idle while the vehicle is traveling.

5. In a motor driven vehicle, the combination with a pair of rear wheels, a front steering wheel, a supporting frame, a motor mounted on the frame, mechanism for driving the rear wheels from the motor, comprising a rearwardly extending shaft, and mechanism for driving the front wheel from the shaft for driving the rear wheels, comprising an upwardly and forwardly inclined shaft and gearing between said latter shaft and the front wheel, of a clutch between said shafts at the rear end of the inclined shaft for disconnecting the inclined shaft from the shaft for driving the rear wheels, and a clutch at one side of and coaxial with the front wheel for disconnecting said gearing from the front wheel so that the inclined shaft and gearing for driving the front wheel will idle while the vehicle is traveling.

6. A motor driven vehicle comprising in combination, a frame, a dirigible front wheel provided with a hub and a demountable body, a steering fork for said wheel pivoted on the frame, power driven mechanism for driving said wheel, including gearing at one side of the fork and the wheel, and an axle for the wheel mounted in said fork, said fork comprising a rigidly connected arch and side member at the side of the wheel at which the gearing is mounted, and an opposite side member movably connected to said arch to provide an opening for the removal of the demountable portion of the wheel, independently of the gearing, and means for detachably connecting the lower end of the side member to the axle.

7. A motor driven vehicle comprising in combination, a frame, a dirigible front wheel provided with a hub and a demountable body, a steering fork for said wheel pivoted on the frame, power driven mechanism for driving said wheel including gearing at one side of the fork and the wheel, and an axle for the wheel fixedly mounted in said fork, said fork comprising a rigidly connected arch and side-member at the side at which the gearing is mounted, and an opposite side-member pivotally connected to said arch, to provide an opening for the removal of the demountable portion of the wheel, independently of the gearing.

8. A motor driven vehicle comprising in combination, a frame, a dirigible front wheel provided with a hub and a demountable body, a steering fork for said wheel pivoted on the frame, power driven mechanism for driving said wheel, including gearing at one side of the fork and the wheel, an axle for the wheel fixedly mounted in said fork, said fork comprising a rigidly connected arch and side at the side at which the gearing is mounted, and an opposite side-member pivotally connected to said arch to provide an opening for the removal of the demountable portion of the wheel, independently of the gearing, and means for detachably connecting the lower end of the pivoted member to the axle.

9. A motor driven vehicle comprising in combination, a frame, a dirigible front wheel comprising a hub and a demountable body, a steering fork for said wheel pivoted on the frame, power driven mechanism for driving said wheel, including gearing at one side of the fork and the wheel, and an axle for the wheel mounted in said fork, said fork comprising upper and lower sections and cushioning means between them, the lower fork section comprising a rigidly connected arch and side at the side at which the gearing is mounted, and an opposite side-member movably connected to said rigid fork side to provide an opening for the removal of the demountable portion of the wheel independently of the gearing.

10. In a motor driven vehicle, the combination of a frame provided with a housing at its front end, a motor mounted on the frame, a single steering wheel, a fork mounted for turning the steering wheel on a steering axis, a motor-driven shaft having its front end extended into the housing, a shaft journalled in the housing and terminating and coaxial with the steering axis, a pair of gears between the motor-driven shaft and the shaft which is coaxial with the steering axis, said fork comprising upper and lower members journalled in the housing above and below the coaxial shaft and a connection outside of the housing between said members of the fork, and gearing for driving the steering wheel, comprising a shaft outside of the housing, and gears between said last mentioned shaft and the coaxial shaft and between said outside shaft and said wheel for exerting driving torque in opposite directions and balancing the turning torque exerted on the fork to render the wheel freely dirigible without interference by the driving torque.

11. In a motor driven vehicle, the combination with a pair of rear wheels, a steering wheel, a fork for steering the wheel, a motor, and mechanism for driving the rear wheels and the steering wheel from the motor, of a front frame section including a central longitudinally extending member, a rear frame section, means for demountably connecting the frame sections together between the front and rear wheels, comprising a cross-member rigidly connected to the front section adjacent its front end and demountably connected to the front end of the rear section, a bracket at the rear end of the front section demountably connected to the rear section, the motor and the mechanism for driving the rear wheels being mounted on the rear frame section, the mechanism for driving the front wheel being mounted on the front section and including a shaft in said longitudinal member and a detachable driving connection at the rear end of the front frame section.

ANTHONY F. SEIDER.

REFERENCES CITED

The following references are of record in the file of this patent:

UNITED STATES PATENTS

| Number | Name | Date |
| --- | --- | --- |
| 949,828 | Lassen | Feb. 22, 1910 |
| 1,461,735 | Peters | July 17, 1923 |
| 1,571,236 | Dieckmann | Feb. 2, 1946 |
| 1,715,627 | Ruth | June 4, 1929 |
| 1,933,101 | Du Pont et al. | Oct. 31, 1933 |
| 1,956,319 | Du Pont et al. | Apr. 24, 1934 |